H. T. WARD.
BEEHIVE.
APPLICATION FILED JULY 11, 1908.
909,973.
Patented Jan. 19, 1909.
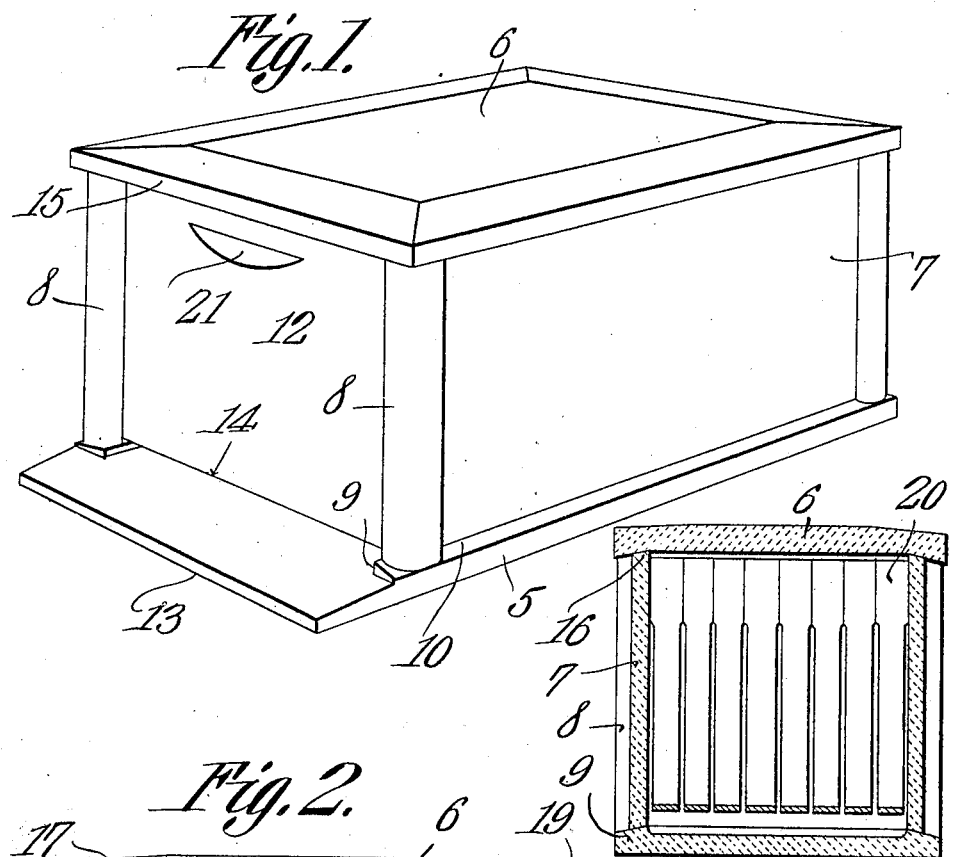
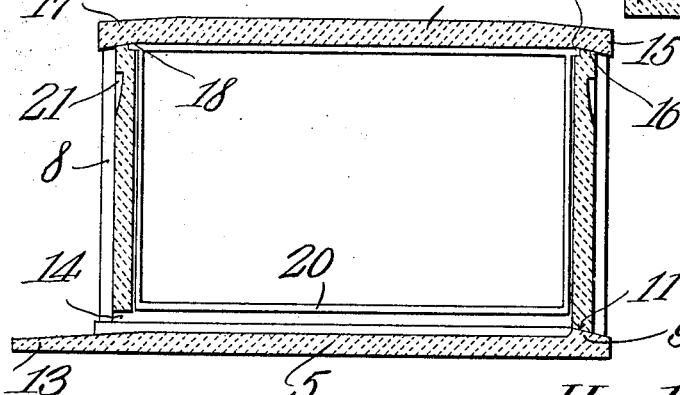
Inventor
Hugh T. Ward.

UNITED STATES PATENT OFFICE.

HUGH T. WARD, OF INGLESIDE, TEXAS.

BEEHIVE.

No. 909,973.  Specification of Letters Patent.  Patented Jan. 19, 1909.

Application filed July 11, 1908. Serial No. 443,021.

*To all whom it may concern:*

Be it known that I, HUGH T. WARD, a citizen of the United States, residing at Ingleside, in the county of San Patricio and State of Texas, have invented a new and useful Beehive, of which the following is a specification.

This invention relates to bee hives and has for its object to provide a comparatively simple and inexpensive device of this character, the body of which is constructed from cement, concrete or similar plastic material, thereby to strengthen the hive and prevent injury to the latter when exposed to the elements.

A further object of the invention is to provide an artificial stone bee hive formed of a plurality of sections, the lower or bottom section of which is inclined or beveled in the direction of the intermediate section to produce an entrance passage for the bees.

A further object is to form the side and end walls of the hive with beveled edges for engagement with correspondingly beveled portions on the top and bottom sections, thereby to prevent the entrance of rain or moisture to the interior of the hive.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claim.

In the accompanying drawings forming a part of this specification: Figure 1 is a perspective view of a bee hive constructed in accordance with my invention. Fig. 2 is a longitudinal sectional view of the same. Fig. 3 is a transverse sectional view.

Similar numerals of reference indicate corresponding parts in all of the figures of the drawings.

The improved bee hive forming the subject matter of the present invention is preferably rectangular in shape, as shown, and formed of a plastic composition preferably consisting of cement, plaster of paris and sand, in any desired proportions.

The hive includes a base or bottom section 5, a top section 6, and an intermediate section 7, the corners of the intermediate section 7 being reinforced and strengthened by the provision of pillars or posts 8 preferably formed integral with the side and end walls of said section, as shown.

Secured to or formed integral with the upper surface of the bottom section 5 is a marginal flange 9, the upper face of which is inclined or beveled, as indicated at 10, for engagement with the correspondingly beveled lower edges 11 of the end and side walls of the intermediate section 7, thereby to prevent the entrance of rain or moisture to the interior of the hive. The forward end of the base is preferably extended longitudinally beyond the front wall 12 to form a ledge 13, the upper surface of which is inclined or beveled in the direction of the front wall so as to direct the bees to the entrance passage 14, the latter being produced by spacing the lower edge of the front wall 12 a short distance above the upper surface of the base 5.

The top section 6 preferably projects beyond the side and end walls of the intermediate section 7 to form a marginal over-hang or shed 15, the lower face of which is inclined or beveled at 16 for engagement with the correspondingly beveled upper longitudinal and transverse edges of the intermediate section to prevent the entrance of moisture at the top of the hive, the upper surface of the top section 6 being inclined or beveled at 17 to assist in directing the water downwardly over the over-hang or shed 16.

The upper edges of the front and rear wall of the intermediate section 7 are rabbeted to form seating grooves 18 for the reception of the supporting lips 19 of removable frames 20, the latter being of any approved construction and arranged side by side, as best shown in Fig. 3 of the drawings.

Suitable depressions 21 are preferably formed in the front and rear wall of the intermediate section 7 so that the same may be readily lifted off the base section 5 when necessary.

It will thus be seen that by removing the top section 6 access may be readily had to the interior of the hive so as to permit the introduction or removal of the frames, while by elevating the intermediate section 7 the base of the hive may be readily exposed to permit of cleaning, when necessary. If desired, however, the intermediate section may be rigidly secured to the base or bottom section by coating the inclined edges 11 with a layer of cement, mortar or other adhesive material.

The hives may be made in different sizes and shapes and constructed of cement, concrete, terra cotta, glass or other suitable material without departing from the spirit of the invention.

Having thus described the invention what is claimed is:

An artificial stone bee-hive including a bottom section having a vertically disposed flange secured to the upper surface thereof on the opposite side and at the rear of said base, the upper surface of the base at the front thereof and between the side flanges being smooth and unobstructed, said flange having its upper edge inclined towards the outer edge of the base, an intermediate section having its lower edge inclined to conform to and adapted to bear against the inclined edge of the flange, the lower edge of the front wall of the intermediate section being spaced from the smooth unobstructed surface of the base at the front of the latter to form an entrance passage, said intermediate section having its upper edge inclined downwardly, and a cover section having its lower face correspondingly inclined for engagement with the inclined upper edge of the intermediate section, one end of the base being extended longitudinally beyond the entrance passage to form a ledge, the upper surface of which is inclined in the direction of said entrance passage.

In testimony that I claim the foregoing as my own, I have hereto affixed my signature in the presence of two witnesses.

HUGH T. WARD.

Witnesses:
 CARL SHAVER,
 RUDOLPH SCHWABE.